(12) United States Patent
Piegendorfer et al.

(10) Patent No.: US 7,681,415 B2
(45) Date of Patent: Mar. 23, 2010

(54) METHOD AND DEVICE FOR MELTING THE ENDS OF RODS

(75) Inventors: Johann Piegendorfer, Altfraunhofen (DE); Martin Zöttl, Tiefenbach (DE)

(73) Assignee: Schott AG (DE)

( * ) Notice: Subject to any disclaimer, the term of this patent is extended or adjusted under 35 U.S.C. 154(b) by 435 days.

(21) Appl. No.: 11/686,319

(22) Filed: Mar. 14, 2007

(65) Prior Publication Data

US 2007/0214836 A1  Sep. 20, 2007

(30) Foreign Application Priority Data

Mar. 16, 2006 (DE) .................. 10 2006 012 583

(51) Int. Cl.
 C03B 23/00 (2006.01)
 C03B 23/18 (2006.01)
 C03B 29/00 (2006.01)
(52) U.S. Cl. .......................... 65/272; 65/102; 65/108; 65/109; 65/269; 65/285
(58) Field of Classification Search .............. 65/108, 65/109, 269, 272, 276–279, 285, 292–299
See application file for complete search history.

(56) References Cited

U.S. PATENT DOCUMENTS 3,066,506 A   12/1962   Dichter
4,385,919 A   5/1983   Goffredi et al.

FOREIGN PATENT DOCUMENTS

DE    324750       9/1920
DE    637506 A    10/1937
GB    365594       1/1932
GB    1 056 873 A  2/1967

*Primary Examiner*—Khanh Nguyen
*Assistant Examiner*—Carson Gross
(74) *Attorney, Agent, or Firm*—DeMont & Breyer, LLC

(57) ABSTRACT

The invention relates to a method for treating the ends of glass rods in which glass rods are inserted into receptacles in a carrier and with the carrier are carried past a burner and at least one rail in an advancing direction, the flame of the burner melting at least one end of the glass rods and the glass rods being lifted by the rail in the receptacles and rolling on the rail so that the glass rods are made to rotate during the melting process.

17 Claims, 5 Drawing Sheets

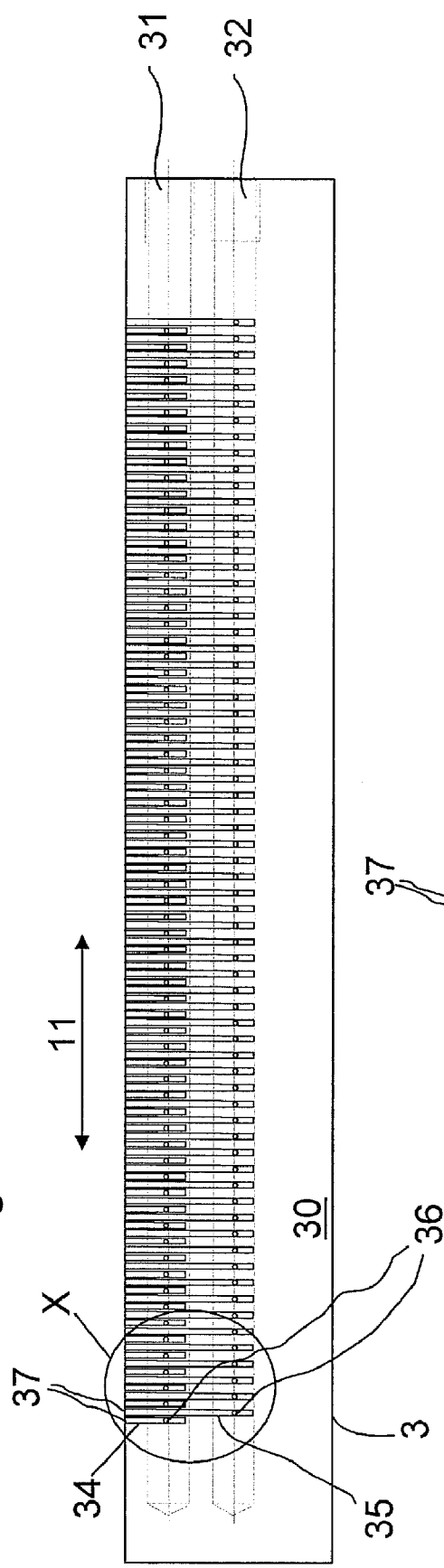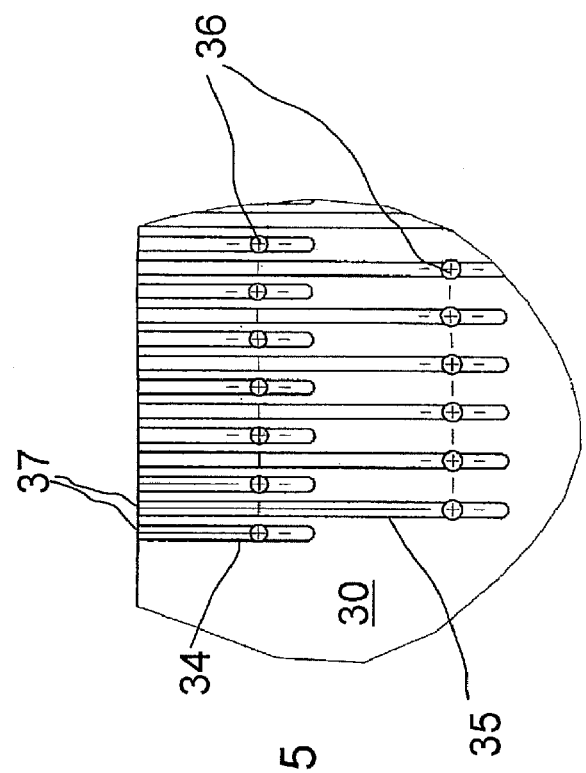

METHOD AND DEVICE FOR MELTING THE ENDS OF RODS

Figure 1:
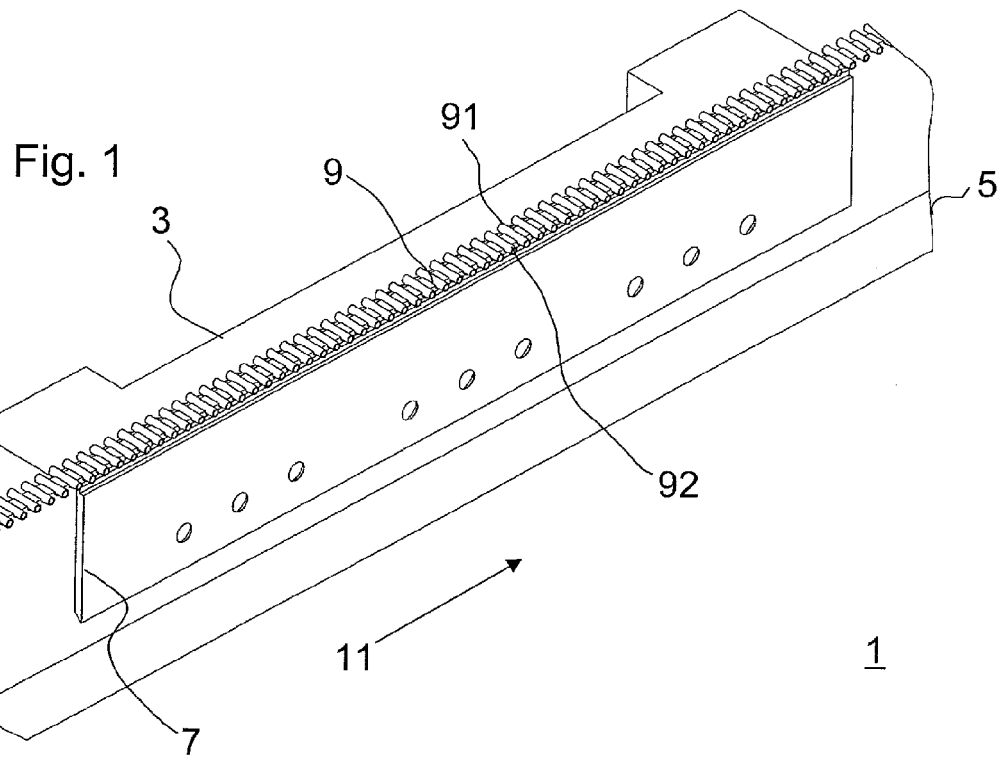

The invention relates generally to the post-processing of rod-shaped meltable material, in particular the melting of the ends of glass rods.

Rod-shaped glass material, either a solid material or in the form of tubes, is subdivided for many applications into sections and these sections re-used. For example, glass tube sections are used to manufacture reed switches. Likewise, glass tube sections are also used as packaging for other electrical and electronic components. Sections of solid glass rods are also used as light guides.

The sections are generally disconnected from the rod by breaking. However, the fractured edges can cause problems. Inter alia, fractures starting from the fractured edges can reduce the stability, have an adverse effect on the visual properties in the case of light guides and lead to leaks in glass tubes. The sharp edges which arise during the breaking process are in many case undesired. In order to avoid these problems, it is appropriate to melt the ends. However, in this process it is possible for problems to occur if the melting does not take place uniformly. In this case, it is possible, inter alia, for disadvantageous, intolerable deviations from the desired dimensions of the sections to occur. The invention is accordingly based on the object of permitting particularly uniform melting of the ends of sections. This object is achieved in a most surprisingly simple way by means of the subject matter of the impendent claims. Advantageous embodiments and refinements of the invention are given in the respective dependent claims.

Accordingly, the invention provides a method for treating the ends of glass rods in which glass rods are inserted into receptacles of a carrier, and with the carrier are carried past a burner and at least one rail in an advancing direction, the flame of the burner melting at least one end of the glass rods, in particular the front face at this end, and the glass rods being lifted by the rails in the receptacles and rolling on the rail so that the glass rods are made to rotate during the melting process.

A corresponding device for treating the ends of glass rods, in particular for carrying out the method according to the invention, comprises a burner, a carrier with receptacles for the insertion of glass rods, an advancing device for carrying the carrier past the burner, and at least one rail which runs along the carrier and whose upper side runs in the region of the carrier above the lowest point of the receptacle so that as the glass rods which are inserted into the carriers pass the flame of the burner they are lifted by the rail by means of the advancing device in the receptacles and roll on the upper sides of the rail. The glass rods are preferably inserted into correspondingly configured receptacles transversely with respect to the advancing direction.

An advancing device can comprise, in particular, a suitable conveyor belt on which the carrier is placed. Such a conveying mechanism also easily permits various kinds of carriers for various rod dimensions to be conveyed.

The burner and the rails are preferably arranged in a stationary fashion, in this case the carrier being carried past the burner. However, it is also possible that the advancing device does not move the carrier past but instead moves the burner and the rails past a stationary carrier. In terms of the rotation of the glass rods brought about by the rolling on the rail, the important factor is essentially the relative movement between the carrier and rail, which can be brought about with the two abovementioned possibilities and generally by a relative movement of rails and carrier, or its receptacles.

The invention makes available a very simple arrangement with which uniform post-processing of the ends of the glass rods is brought about. The rolling of the glass rods during the melting in the flame brings about uniform heating of the ends of the glass rods. The melting in particular also provides a smooth, fire-polished surface.

Furthermore, both ends of the glass rods, in particular the material at the end faces, are preferably melted. For this purpose, burners are arranged on both sides of the carrier.

One embodiment of the invention provides that the glass rods are lifted on one side by a rail arranged to the side of the carrier, and roll on this rail. According to another embodiment of the invention, the carrier is moved through between two spaced-apart rails, both ends being lifted in this case.

As a result of the rolling on the upper side of the rail, the glass rods rotate, at an angular speed of v/r provided no friction or slip slows down the rotation. Here, v designates the advancing speed and r designates the radius of the glass rods.

In a further preferred configuration of the invention, there is provision that the receptacles in the carrier are configured as recesses or depressions in the carrier. They can be adapted in particular to the shape of the glass rods. Good thermal contact is thus provided between the glass rods and the carrier.

In order to bring about as uniform a heating as possible of the end or ends of the glass rods, it is furthermore particularly preferred if the burner has a plurality of burner nozzles which extend in the advancing direction. With such a power burner the ends of the glass rods are moved successively through not just one individual flame but through a plurality of flames while the rods roll.

With the method according to the invention it is possible, inter alia, to smooth fractured edges of the glass rods. It is likewise also possible in the case of small glass tubes that one end of these small glass tubes is closed by melting. In this way, small glass tubes which are closed at one end are obtained. Such glass tubes are suitable, for example, for encapsulating transponders or for manufacturing ampullas.

The method is suitable in particular for treating relatively small glass rods having a diameter in the range from 0.5 mm to 30 mm, preferably in the range from 1 mm to 20 mm. In order to be able to process the various formats of glass rods, in each case it is possible to prepare carriers whose receptacles are embodied for the respectively specified diameters.

In one development of the invention, a heating device for the carrier is also provided. The carrier can particularly advantageously be preheated with such a heating device. In particular, this preheating of the carrier can be carried out with glass rods inserted. As a result, the parts of the glass rods which rest on the carrier are also preheated. This is favorable, inter alia, in order to avoid sudden transitions in the glass rods as a result of excessively high temperature change stresses. A particular advantage is obtained particularly when treating glass tubes. Heating the glass tubes on the carrier prevents deposition of condensates within the tubes when they are carried past the burner. The preheating is preferably carried out in multiple stages. In particular, it is possible for this purpose to place the glass rods on a carrier which is preheated in a first preheating step and to further preheat carriers with glass rods in at least one further step before the melting process.

The following parameters have proven particularly favorable in order, on the one hand, to avoid temperature stresses and, on the other hand, to obtain small tolerances in the form of the ends of the glass rods:

The advancing speed with which the glass rods are carried past the burner is preferably in the range from 0.1 to 10 cm/s, preferably in the range from 0.5 to 5 cm/s, and particularly preferably in the range from 0.8 to 4 cm/s.

Furthermore it is favorable if the ends of the glass rods are flame treated by the burner for a duration in the range from 3 to 15 seconds, preferably in the range from 5 to 10 seconds.

In order to facilitate the flame treatment of the ends of the glass rods, it is also favorable if the rolling ends of the glass rods project beyond the rail.

Furthermore it is particularly advantageous if the rail is arranged between the carrier and burner openings. In this way, the rail can simultaneously act as a shield which prevents the burner carrying out flame treatment on other parts of the glass rods apart from their ends. In addition to one or more rolling bars on which the glass rods are made to rotate by rolling on their upper side, it is furthermore also advantageous to provide a run-up bar which runs in the advancing direction. With this run-up bar, the position of the glass rods which are carried past is aligned or arranged transversely with respect to the advancing direction. In order to facilitate the lifting of the glass rods at the start of the rail, the rail is furthermore preferably beveled at at least one end in the advancing direction. Both ends of the rail are preferably beveled so that the glass rods do not drop back abruptly into the receptacles after rolling on the upper side but rather are positioned completely in the receptacles again after rolling slowly on the oblique surface.

In terms of the burner, it is also preferred that the combustible gas is not mixed in the nozzles of the burner but rather outside the nozzles in a mixer. The latter is preferably arranged upstream of a gas quantity regulator so that the combustible gas together with the oxidation agent which it contains is preferably regulated by air added by the mixer. This measure has surprisingly proven very favorable in obtaining a more simple way of regulating the burner. In particular, even very low overpressures can then be regulated precisely in order to bring about uniform burning and thus also uniform post-treatment of the glass rod ends, in particular their end faces.

In a further advantageous configuration of the invention, a burner is provided which has two different systems of gas feed ducts with nozzles arranged in an alternating fashion with respect to one another. As a result, it is possible, inter alia, for combustible gas to be fed via at least two gas feed ducts which are connected to a plurality of nozzles which are arranged in alternating fashion, in particular in the advancing direction. In addition, in contrast to what is described above, the various components of the combustible gas can be fed and regulated separately via the nozzles or outlet openings which are arranged in an alternating fashion, said components can first be mixed with one another above the nozzles during the combustion process. Finally, with systems of gas feed ducts which vary in such a way it is also possible to feed two different combustible gases to the nozzles in a respectively alternating fashion. The various possibilities thus permit inter alia, sensitive regulation and adaptation of various types of glass in a way which is matched to the dimensions of the glass rods to be treated.

A compact design for the burner with very fine ducts for the gas supply can also be obtained if the gas supply system of the burner has depressions in a burner body, which depressions are closed to the side, preferably by the rail, and thus form ducts for the gas supply. As a result of the covering with the rail it is possible also to ensure that the outlet openings of the ducts form burner nozzles which are very small and open directly at the rail. This ensures that the flames of the burner likewise burn directly at the rail. This is advantageous since the rail then produces a sharp delimitation of the heating zone along the glass rods to be treated, with selective heating of only the ends of the glass rods which project beyond the rail.

The glass rods which can be manufactured according to the invention are defined by at least one, preferably two, fire-polished end faces. In this context, the very uniform and precisely adjustable melting process which is achieved according to the invention provides very tight tolerances in the deviations from the diameter and length. As a result, glass rods with a length dimension tolerance of at maximum 0.20 mm can be manufactured. In terms of the external diameter, and/or in the case of glass tubes also the internal diameter, it is possible to comply with deviations of at maximum 0.08 mm, preferably only 0.05 mm.

The method and the device or the glass rods manufactured therewith can, inter alia, be used advantageously to manufacture reed relays, sensors, transponders and light guides.

The invention will be explained in more detail below by means of exemplary embodiments and with reference to the appended drawings in which identical reference symbols refer to identical or similar parts.

Figure 2:
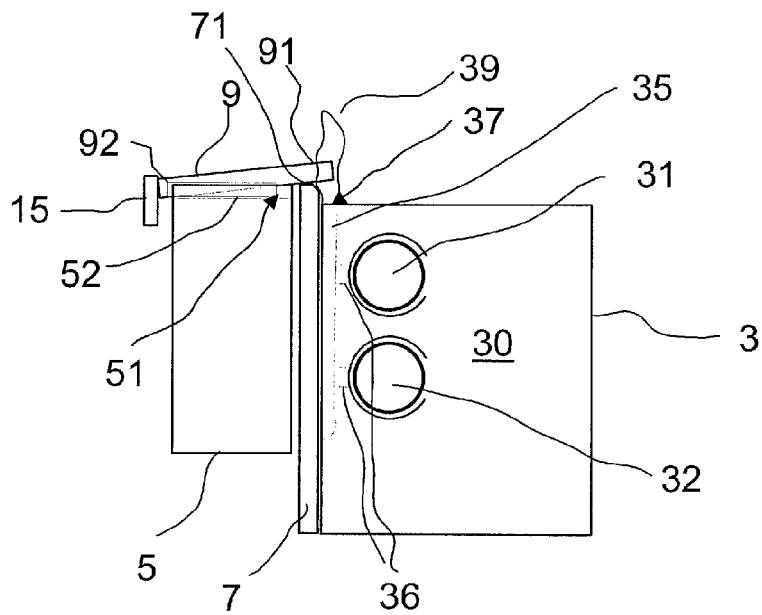
Figure 3:
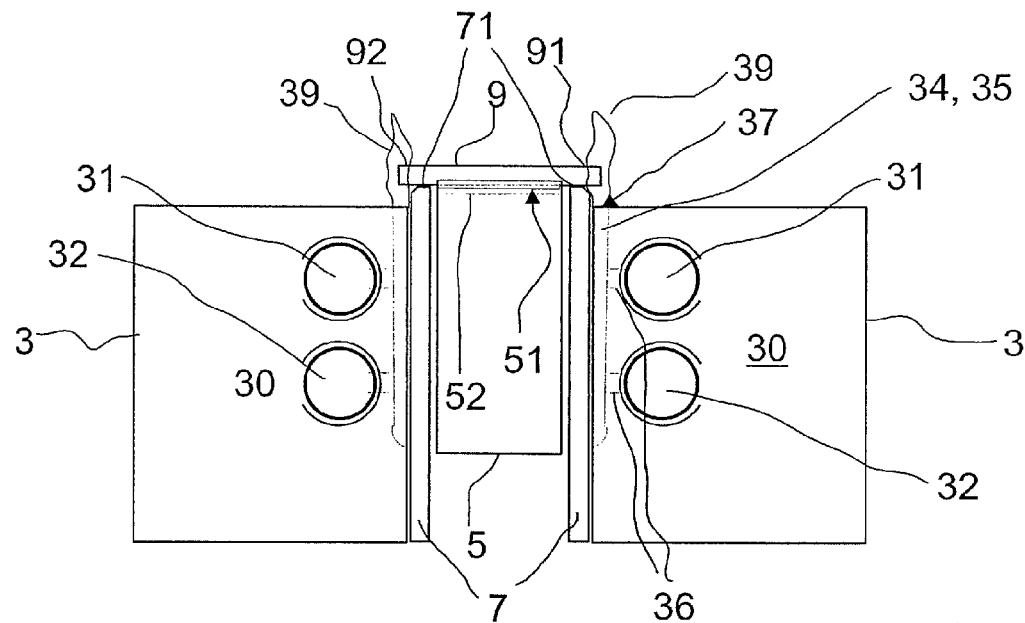
Figure 6:
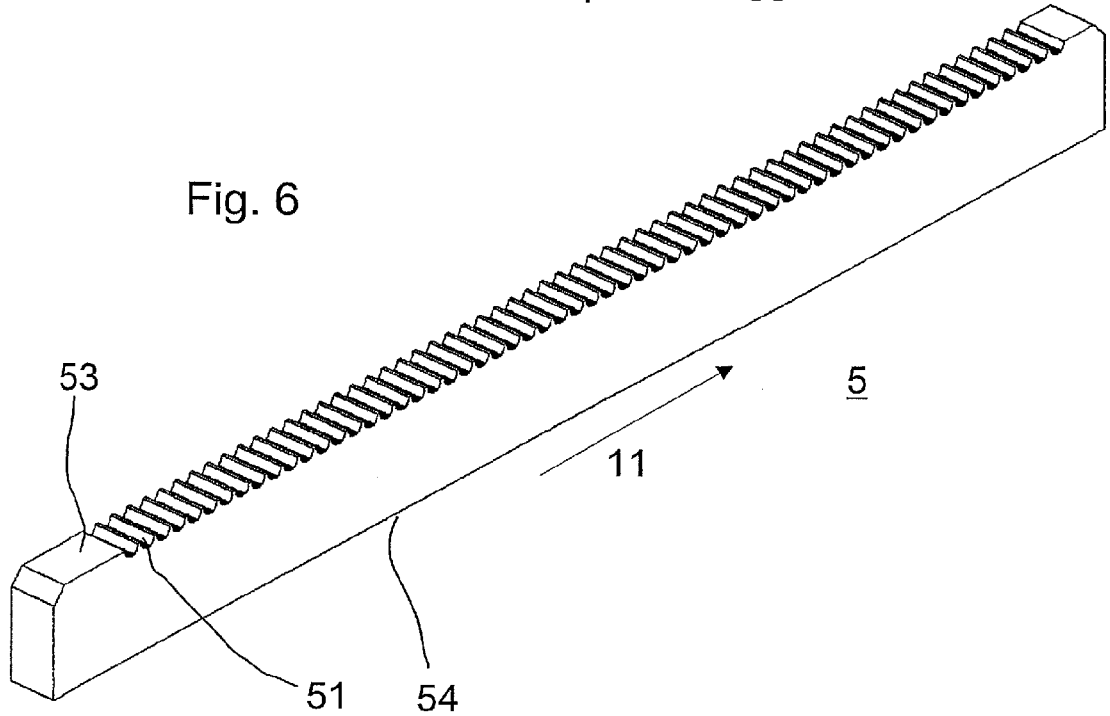
Figure 7:
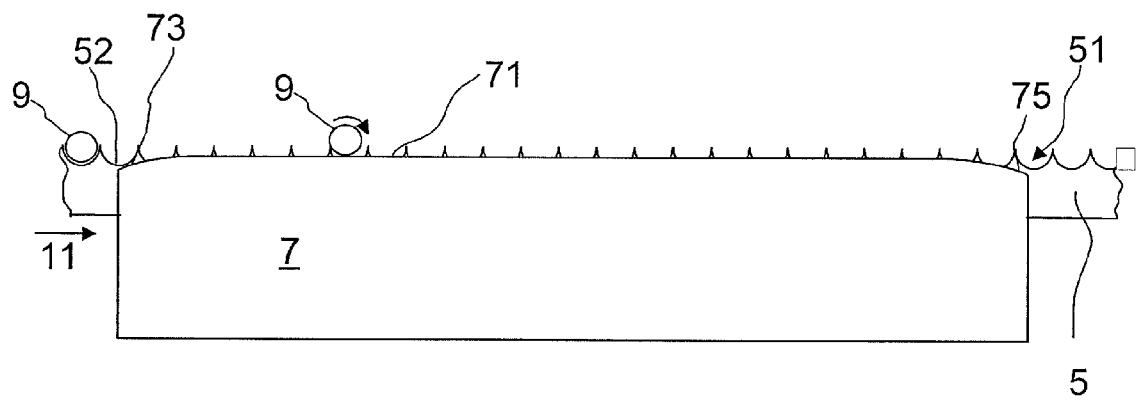
Figure 8:
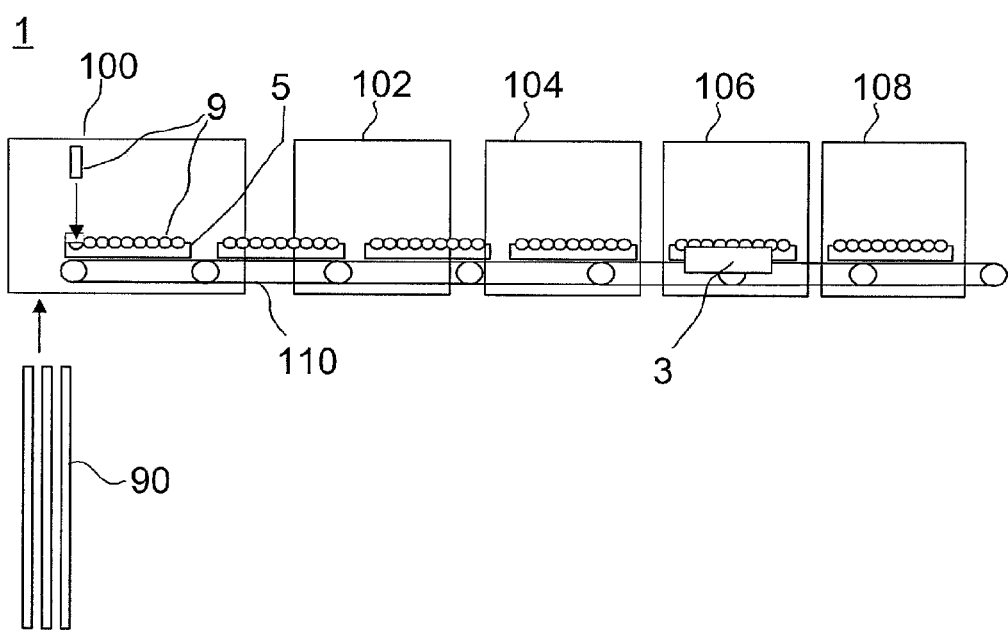
Figure 9:
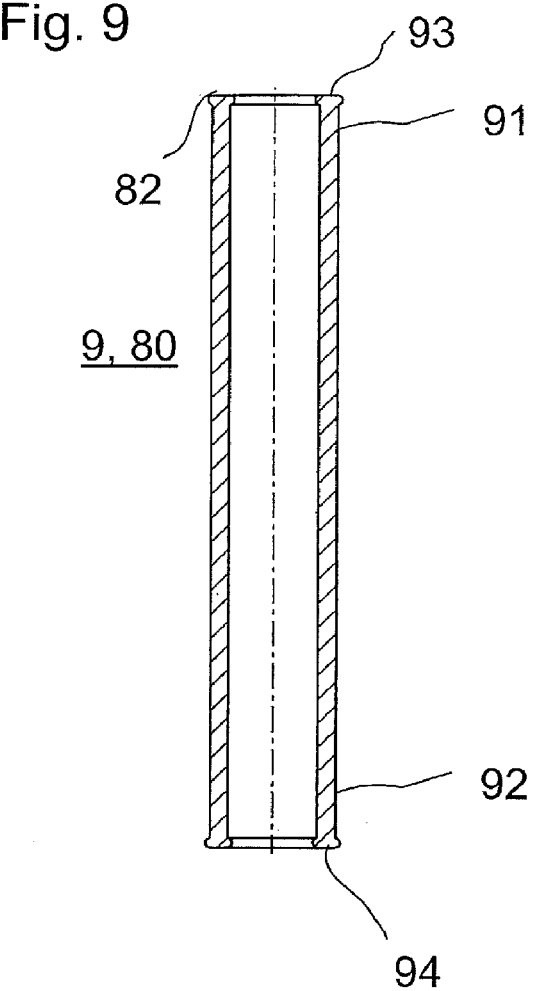
Figure 10:
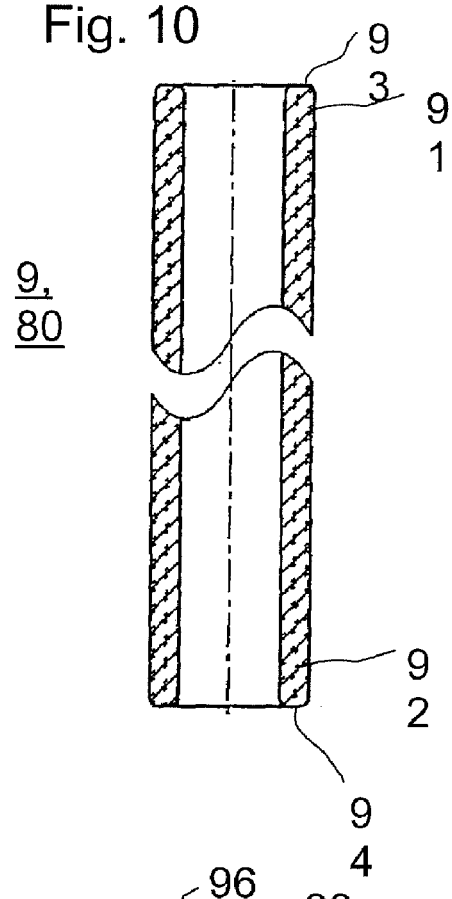
Figure 11:
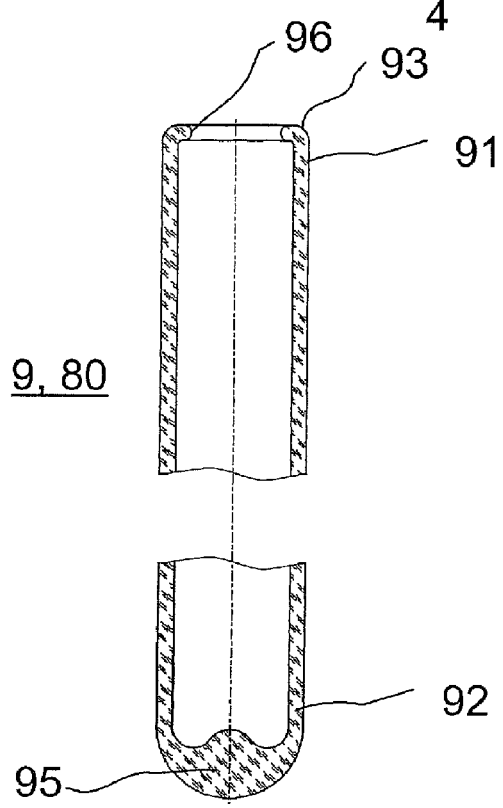

In said drawings:

FIG. 1 is a view of parts of a device according to the invention,

FIG. 2 is a view of the arrangement illustrated in FIG. 1 in the advancing direction of the carrier, FIG. 3 shows a variant with rails arranged on each side of the carrier, FIG. 4 is a view of the burner, FIG. 5 is an enlarged view of a detail of the region X in FIG. 4, FIG. 6 is a view of a carrier, FIG. 7 is a side view of an arrangement composed of rolling rail and carrier, FIG. 8 is a diagrammatic overall view of an exemplary embodiment of a device according to the invention, and FIGS. 9 to 11 show examples of glass rods manufactured according to the invention.

FIG. 1 shows parts of a device according to the invention which is designated in its entirety by the reference symbol 1. The device 1 for treating the ends 91, 92 of glass rods 9 comprises a burner 3, a carrier 5 with receptacles for placing the glass rods 9 in, an advancing device (not illustrated in FIG. 1) for carrying the carrier 5 past the burner 3 in an advancing direction 11, and a rail 7 which runs along the carrier 5 and whose upper side runs above the lowest point of the receptacles in the region of the burner 3 so that as glass rods 9 which have been inserted into the receptacles are carried past the flames of the burner 5 said glass rods 9 are lifted by the rail 7 by means of the advancing device in the receptacles, and roll on the upper side of the rail 7. In the process, the glass rods 9 are carried past the burner 3 at an advancing speed in the range from 0.1 to 10 cm/s, preferably in the range from 0.5 to 5 cm/s, particularly preferably in the range from 0.8 to 4 cm/s. The advancing speed is preferably set here in such a way that the ends of the glass rods are flame treated by the burner by the flames of the burner 3 for a duration in the range from 3 to 15 seconds, preferably in the range from 5 to 10 seconds, and the material at the end faces is melted.

As is apparent from FIG. 1, the glass rods are inserted in such a way that their cylinder axes lie transversely with respect to the advancing direction so that they can roll in the advancing direction over their outer cylinder surface.

The arrangement shown in FIG. 1 and the mechanism of the will be explained below in more detail with reference to the view shown in FIG. 2. FIG. 2 shows the arrangement in the advancing direction 11. The burner 3 is configured as a power burner with a plurality of nozzles 37 which are arranged one behind the other, and for this purpose it comprises a base body 30 with gas feed ducts 31, 32 which run in the advancing direction. A plurality of ducts 34, 35 which are arranged one behind the other in the advancing direction and run vertically in this exemplary embodiment is connected to the gas feed ducts 31, 32 via branching ducts 36. In this context, the ducts are divided into two groups, the first group of ducts 34 being connected to the gas feed duct 31, and the second group of ducts 35 being connected to the gas feed duct 35. This configuration of the invention will be described in more detail below with reference to FIGS. 4 and 5. The ducts 34, 35 lead into openings 37 which constitute the burner nozzles.

The ducts 35 are embodied as milled elements which are closed off by the rail 7 which is attached to the base body 30 of the burner 3.

Semicyclindrical receptacles 51 in which the glass rods 9 to be treated are placed are inserted into the upper side of the carrier 5. In order to fire-polish the rod ends, the carrier 5 is then carried past the rail in such a way that the base point, or the lowest point 52 of the receptacles 51, runs below the upper side 71. In the process, the rods, which rest with their lateral surface on the base point 52, are each lifted at one end 91 by the rail 7, as shown in FIG. 2, and roll on the upper side 71 of the rail 7, while the ends are flame treated by the flames 39 produced at the nozzle openings 37, and said ends melt as the rods 9 roll.

However, the glass rods are not completely lifted out of the receptacles 51 so that the rods are still carried and moved onward in the receptacles.

The ends 91 of the glass rods project beyond the rail 7 and into the flames 39. The rail 7 which is arranged between the carrier 5 and the burner openings 37 also advantageously shields other parts of the glass rods 9 from the flame treatment, apart from their ends 91 of said glass rods 9. This prevents the glass rods from becoming too soft and being able to bend or even melt between the ends 91, 92.

The glass rods 9 on the carrier are also carried past a run-up bar 15 which runs in the advancing direction and their position is oriented transversely with respect to the advancing direction. The transverse alignment with respect to the advancing direction ensures that the ends 91 all project equally far beyond the rail 7 and into the flames 39 of the burner, within the scope of the length tolerance.

In the example shown in FIG. 2, the glass rods are also lifted on one side by means of an individual rail.

FIG. 3 shows a variant with rails 7 and burners 3 which are arranged on each side of the carrier. In this variant, the carrier 3 is accordingly moved through between the two spaced-apart rails 7, and both ends 91, 92 of the glass rods 9 are lifted so that both ends 91, 92 of the glass rods 9 roll over the upper side 71 of the rails 7 and their outermost regions are melted.

FIG. 4 shows, for the purpose of further clarification of the structure, a view of the burner 3 such as is used in the exemplary embodiments in FIGS. 1 to 3. FIG. 5 is an enlarged illustration of the detail indicated by X.

From FIGS. 4 and 5 it is apparent that the nozzles 37 which are arranged in the advancing direction 11 are also assigned in an alternating fashion to two different gas supply systems, one system being supplied with gas via the gas supply duct 31, and the other system via the gas supply duct 32. The ducts 34 which are connected to the gas supply duct 31 and the ducts 35 which are connected to the further gas supply duct 32 are embodied in each case here as depressions in the burner body 30, which depressions are then closed laterally by the rail 7 (not illustrated here) so that the combustible gas can escape only through the nozzles 37. By means of the nozzles 37 which are connected in an alternating fashion to the gas supply ducts 31, 32 it is possible to operate the burner, for example, as an externally mixing burner in that combustible gas and oxidizing agent are fed separately via the ducts 31, 32 and escape through respectively adjacent nozzles 37. It is likewise possible to feed premixed combustible gas, in which case it is additionally possible to make available different combustible gases via the ducts 31, 32 and/or to regulate the gas quantities through the ducts 31, 32 separately.

FIG. 6 illustrates a view of an exemplary embodiment of a carrier 5. The carrier 5 comprises a base body which is elongated in the advancing direction 11 and in whose upper side 53 a plurality of receptacles in the form of recesses or depressions which are arranged one behind the other in the advancing direction. These recesses are semicylindrical with a transverse cylinder axis with respect to the longitudinal extent of the carrier body or with respect to the advancing direction. Correspondingly, the cylindrical glass rods 9 can then be placed in these depressions transversely with respect to the advancing direction 11, as shown in FIG. 1.

The underside 54 of the carrier 5 is planar in this exemplary embodiment so that the carrier can easily be placed with this side on a conveyor belt as an advancing device for carrying the carrier past the burner.

FIG. 7 shows in a side view an exemplary embodiment of a rail 7 such as can be used in the arrangement shown in FIGS. 1 to 3, and a carrier 3 and the mechanism of lifting and rolling the glass rods on the carrier 5 by means of the rail 7.

As is illustrated once more in FIG. 7, the upper side 71 of the rail 7 which runs along the carrier 5 in the advancing direction 11 lies above the lowest point 52 of the receptacles 51 in such a way that as glass rods 9 which are inserted into the receptacles are carried past the flame of the burner they are slightly lifted in the receptacles by the rail by means of an advancing device and roll on the upper side 71 of the rail 7. For the purpose of clarity, only two glass rods 9 which have been inserted into the receptacles 51 are illustrated in FIG. 7.

In order to facilitate the lifting process, the upper side of the rail is beveled at the end 73 to such an extend that the upper side 71 of the rail 7 at this end runs under the lowest point of the receptacle, in particular however under the lowest point of the lateral faces of the glass rods 9 which have been inserted into the receptacles 51. As the carrier 5 is carried past the oblique surface, the ends of the glass rods 9 are then lifted uniformly on as far as the height of the planar region of the upper side 71 of the rail 7 and can roll there. The other end 75 of the rail 7 is also beveled so that after the melting process has ended the glass rods 9 can again roll down the oblique surface uniformly and thus be placed gently in the receptacles 51.

FIG. 8 is a schematic view of an exemplary embodiment of a device 1 according to the invention in its entirety. The device comprises a unit 100 in which long glass rods 9 are divided into relatively short glass rods 9 by breaking and these relatively short glass rods 9 are placed on the carrier 5. The carrier is preferably already preheated here. Preheating can be carried out electrically and/or by means of hot air. A plurality of carriers 5 are used and they are conveyed one behind the other on a conveyor belt 110 as an advancing device. The carriers 5 which are equipped in the unit 100 are then fed through two preheating stages 102 and 104 in which the carrier, together with the glass rods 9 placed in them are heated. An electrical heating or means of heating by means of warm air are appropriate for the first stage 102. The heating in the second stage 104 is preferably carried out with one or more burners.

The carriers which are heated by means of this multiple stage preheating device with stages 102, 104 and glass rods 9 which are conveyed thereon are then fed by means of the conveyor belt 110 to a further unit 106 in which the flame polishing of the rod end is carried out by means of the inventive burner 3 with the rail (not illustrated), as explained with reference to the figures above. Finally, the carriers with the flame-polished glass rods are cooled in a defined fashion in a cooling unit 108.

After the conclusion of the processing steps shown in FIG. 8, the carriers 5 can remain equipped and can be removed from the conveyor belt so that they serve simultaneously as magazines for the treated glass rods in order to carry out further manufacturing steps.

FIGS. 9 to 11 each show examples of glass rods 9 manufactured according to the invention, in a cross sectional view. The examples here each show glass rods in the form of glass tubes 80. Furthermore in all the examples shown, both ends 91, 92 are treated and fire-polished by melting the material at the end faces.

In the example shown in FIG. 9, in each case a small bead 82 has been produced at the end faces 93, 94 by the melting of the glass. This bead can be advantageously used, inter alia, for attaching the small tube. In the exemplary embodiment illustrated in FIG. 10, the ends are only slightly melted so that fire-polished end faces 93, 94 with rounded edges are obtained.

In the example illustrated in FIG. 11, in contrast to the examples in FIGS. 9 and 10 the end 92 of the small glass tube 80 has been closed by the melting process so that a one-sided closure 95 is obtained. Such small glass tubes can be used, for example, as ampullas or encapsulations for electrical or electronic components. Inter alia encapsulation for transponders or sensors is meant here. The other end 91 of this exemplary embodiment has been reshaped into an inwardly curved collar 96 by the melting with the device according to the invention. This collar 96 can advantageously be used to secure electrical or electronic components or else to attach a closure for this end 91.

In all the examples of small glass tubes shown, it is possible to achieve very tight tolerances in their dimensions. For example, the maximum external and/or internal diameters at the ends of the tubes shown can be fabricated with a maximum deviation of at most 0.08 mm, generally even only 0.05 mm. The small glass tubes 80 can also be manufactured with deviations in terms of the length dimension of at most 0.20 mm. This high precision results from the very uniform melting process obtained according to the invention so that identical conditions in terms of the temperature distribution and the treatment time are obtained for all the glass rods, and deviations in shape as a result of the melting are reduced to a minimum.

It is apparent to a person skilled in the art that the invention is not restricted to the exemplary embodiment described above but rather can be varied in a variety of ways. In particular, the features of the individual exemplary embodiments can also be combined with one another.

The invention claimed is:

1. A device for treating the ends of glass rods comprising:
a burner;
a carrier with receptacles for the insertion of glass rods;
an advancing device for carrying the carrier past the burner; and
a rail which runs along the carrier and whose upper side runs above the lowest point of the receptacles in the region of the burner in such a way that, as the glass rods which are inserted into the receptacles pass by the flame of the burner they are lifted by the rail by means of the advancing device in the receptacles and roll on the upper side of the rail.

2. The device as claimed in claim 1, defined by an individual rail which is arranged to the side of the carrier and with which the glass rods are lifted on one side and roll on this rail.

3. The device as claimed in claim 2, wherein the advancing device moves the carrier through between two spaced-apart rails so that both ends of the glass rods are lifted.

4. The device as claimed in claim 1, wherein the receptacles for the insertion of the glass rods are configured transversely with respect to the advancing direction.

5. The device as claimed in claim 1, wherein burners are arranged on both sides of the carrier.

6. The device as claimed in claim 1, wherein receptacles in the carrier are configured as recesses or depressions in the carrier.

7. The device as claimed in claim 1, wherein the burner has a plurality of burner nozzles which are arranged in the advancing direction.

8. The device as claimed in claim 1, wherein the receptacles of the carrier for the insertion of glass rods are embodied with a diameter in the range from 0.5 mm to 30 mm.

9. The device as claimed in claim 1, defined by a heating device for the carrier.

10. The device as claimed in claim 1, defined by a preheating device for preheating the gas rods placed on the carrier.

11. The device as claimed in claim 1, wherein the rail is arranged between the carrier and the burner opening.

12. The device as claimed in claim 1, wherein the rail for lifting the glass rods is beveled at at least one end in the advancing direction.

13. The device as claimed in claim 1, wherein the advancing device comprises a conveyor belt for the carrier to be placed on.

14. The device as claimed in claim 1, defined by a run-up bar which runs in the advancing direction and the position of glass rods carried past said run-up bar is aligned transversely with respect to the advancing direction.

15. The device as claimed in claim 1, defined by a mixer, arranged upstream of a gas quantity regulator, for the combustible gas of the burner.

16. The device as claimed in claim 1, wherein the burner has two different systems of gas feed ducts with nozzles arranged in alternating fashion.

17. The device as claimed in claim 1, wherein the gas supply system of the burner has depressions in a burner body which are closed laterally by the rail and thus form ducts for the gas supply.

* * * * *